United States Patent
Fortuna

(10) Patent No.: US 7,065,361 B1
(45) Date of Patent: Jun. 20, 2006

(54) METHOD OF TUNING HANDOFF NEIGHBOR LISTS

(75) Inventor: Frederick L. Fortuna, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 665 days.

(21) Appl. No.: 10/006,080

(22) Filed: Dec. 6, 2001

Related U.S. Application Data

(60) Provisional application No. 60/254,419, filed on Dec. 8, 2000.

(51) Int. Cl.
*H04Q 7/20* (2006.01)

(52) U.S. Cl. .................. 455/438; 455/436; 455/513
(58) Field of Classification Search ............. 455/436, 455/438–440, 442–444, 446, 449, 450, 452.1, 455/452.2, 513, 509, 525, 524, 433, 422.1, 455/517, 403, 437, 441; 370/331–334
See application file for complete search history.

(56) References Cited

U.S. PATENT DOCUMENTS

| | | | |
|---|---|---|---|
| 5,499,386 A | | 3/1996 | Karlsson |
| 5,509,051 A | | 4/1996 | Barnett et al. |
| 5,623,535 A | | 4/1997 | Leung et al. |
| 5,640,676 A | | 6/1997 | Garncarz et al. |
| 5,666,650 A | * | 9/1997 | Turcotte et al. ............ 455/437 |
| 5,678,184 A | | 10/1997 | Cutler et al. |
| 5,737,705 A | * | 4/1998 | Ruppel et al. ........... 455/452.2 |
| 5,854,981 A | | 12/1998 | Wallstedt et al. |
| 5,907,807 A | | 5/1999 | Chavez et al. |
| 5,915,221 A | | 6/1999 | Sawyer et al. |
| 5,946,621 A | | 8/1999 | Chheda et al. |
| 5,953,320 A | | 9/1999 | Williamson et al. |
| 5,974,318 A | | 10/1999 | Satarasinghe |
| 6,014,565 A | | 1/2000 | Bonta |
| 6,119,005 A | * | 9/2000 | Smolik ..................... 455/436 |
| 6,505,043 B1 | | 1/2003 | Aihara ..................... 455/436 |

* cited by examiner

*Primary Examiner*—David Hudspeth
*Assistant Examiner*—Eliseo Ramos-Feliciano

(57) ABSTRACT

A wireless telecommunications network includes a mobile switching center (MSC) that controls a plurality of base stations. Each base station defines one or more wireless coverage areas, which may be termed "cells" or "sectors." Associated with each of these wireless coverage areas is a "neighbor list" that lists a number of other wireless coverage areas to which handoffs are preferably made. The MSC has access to a database of handoff statistics and to a database of neighbor lists for the wireless coverage areas that it controls. The handoff statistics provide an indication of the frequencies at which handoffs have occurred between the various wireless coverage areas. To tune a neighbor list for a given wireless coverage area, the other wireless coverage areas are ranked based on the frequency of handoffs involving that wireless coverage area and the given wireless coverage area, as reflected in the handoff statistics. The wireless coverage areas with the highest handoff frequencies are added to the neighbor list for the given wireless coverage area. In preferred embodiments, the wireless coverage areas in a neighbor list may be further categorized into a first priority set, a second priority set, and a third priority set, based on their handoff frequencies.

17 Claims, 2 Drawing Sheets

METHOD OF TUNING HANDOFF NEIGHBOR LISTS

CROSS-REFERENCE TO RELATED APPLICATIONS

This application claims the benefit of U.S. Provisional Application No. 60/254,419, filed Dec. 8, 2000.

BACKGROUND OF THE INVENTION

1. Field of the Invention

The present invention relates in general to wireless telecommunications networks and more particularly to a method for generating neighbor lists for handoffs between the various wireless coverage areas of a wireless telecommunications network.

2. Description of Related Art

In wireless telecommunications networks, mobile stations are typically able to transmit and receive voice, data, or other media in a given format over an air interface. In North America, the most commonly used formats are the Advanced Mobile Phone System (AMPS), Time Division Multiple Access (TDMA), and Code Division Multiple Access (CDMA). Typical TDMA formats are specified in interim standards IS-54B and IS-136, published by the Telecommunications Industries Association/Electronic Industries Association (TIA/EIA). These IS-54B and IS-136 interim standards are fully incorporated herein by reference. A typical CDMA format is specified in the ANSI/TIA/EIA-95-B-99 ("ANSI-95") standard, which standard is fully incorporated herein by reference.

Whether the wireless telecommunications network uses AMPS, TDMA, CDMA, or some other format, the network provides a plurality of wireless coverage areas, which are typically defined by a plurality of base stations. In particular, each base station defines a geographic area, termed a "cell," in which mobile stations can engage in wireless communication with that base station. A base station may also use directional antennas to divide its cell into smaller geographic areas, termed "sectors." In addition to their geographic locations, the cells or sectors are typically distinguishable based on the different control channels, or pilot channels, that the base stations transmit into them.

Each base station is typically connected, either directly or indirectly with a mobile switching center (MSC). The MSCs typically control the operation of a number of base stations and typically switch calls between these base stations and the public switched telephone network (PSTN).

When a mobile station currently in wireless communication with a given base station starts to move out of the range of good wireless communication during the course of a call, the wireless network will attempt to find another base station, or another sector of the given base station, with which the mobile station can continue wireless communication with minimal interruption. This process of transferring a mobile station from one cell to another, or from one sector to another, is termed "handoff."

Though the details of the handoff process may differ, depending on whether the wireless network uses AMPS, TDMA, CDMA, or some other format, in each case the network will typically have defined for each cell or sector a set or list of "neighbor" cells or sectors that serve as handoff candidates. For example, in AMPS systems, the base station currently communicating with a given mobile station will monitor the mobile station's signal strength, and, if the signal strength falls below a threshold value, the base station informs the MSC. The MSC then orders the base stations of "neighboring" cells to monitor the signal from mobile station and to report back the results. When the MSC receives the results, it will typically initiate a handoff to the cell that reported the highest signal strength. Notably, requiring "neighboring" base stations to measure signal strengths and to report the results to the MSC takes up the cellular system's resources. For this reason, it is desirable to minimize the number of cells or sectors in a given "neighbor set" or "neighbor list."

TDMA differs from AMPS in that it typically uses mobile assisted handoff (MAHO). In the MAHO approach, each mobile station periodically monitors the signal strength of the control channel of its current cell or sector, as well the signal strengths of the control channels of the cells or sectors in its "neighbor list." Typically, the wireless network transmits to the mobile station a "neighbor list" to use each time it enters a new cell or sector. The mobile station periodically reports its signal strength measurements for the various members of its neighbor list to its current base station, and the cellular system typically initiates handoffs based on these measurements. Because of the limited number of time slots available to each mobile station with which to make signal strength measurements and to report the results, it is desirable to keep the size of each neighbor list to a minimum. Moreover, the IS-54B TDMA specification sets a limit of 12 cells or sectors in each neighbor list, and the IS-136 TDMA specification sets a limit of 24 cells or sectors in each neighbor list.

CDMA systems take advantage of a CDMA mobile station's ability to communicate on more than one channel at a time to perform, to the extent possible, "soft" handoffs, which are unavailable in TDMA or AMPS systems. During a "soft" handoff, a mobile station already in communication with a first cell or sector, begins to communicate with a second cell or sector, while continuing to communicate with the first cell or sector. To determine when a soft handoff is available, CDMA mobile stations periodically measure the signal strengths of a plurality of pilot channels, with each pilot channel corresponding to a cell or sector, and report at least some of the measured signal strengths to the cellular system. More particularly, CDMA mobile stations typically maintain at least three lists of pilot channels: an active set, a candidate set, and a neighbor set. The active set consists of the pilot channels with which the mobile station is currently communicating. The candidate set consists of the pilot channels that the mobile station is receiving with signal strengths above a threshold value, indicating that good communication is possible with the corresponding cell or sector. The neighbor set consists of pilot channels of "neighboring" cells or sectors that are deemed to be potential candidates for handoff.

In operation, the CDMA network transmits the neighbor set to the mobile station, and the mobile station periodically scans the pilot channels in the neighbor set to measure their signal strengths. When the mobile station encounters a pilot channel with a signal strength that exceeds the threshold value, the mobile station adds it to the candidate set. Typically, the mobile station then requests the cellular system to allow communication with the corresponding cell or sector. If such communication is granted, the mobile station adds the pilot channel to the active set. If the signal strength of a pilot in the active set or candidate set falls below a threshold, it may be removed from the candidate set and returned to the neighbor set.

In this way, the neighbor set defines the sectors or cells with which the mobile station may potentially effect a soft handoff. However, because the process of scanning the pilot channels in the neighbor set consumes part of the mobile station's bandwidth, the size of the neighbor set should be minimized. In fact, the ANSI-95 standard limits the number of pilot channels that can be included in the neighbor list to ten. The ANSI-95 standard also allows the pilot channels in the neighbor set to be assigned one of three priority levels: 2, 1, or 0. The priority level determines how frequently the mobile station scans for that pilot channel, with level 2 being the highest priority and level 0 being the lowest priority. Thus, for efficient operation, the neighbor set must be properly defined and each pilot channel in the neighbor set must be properly prioritized.

Whether a wireless network uses AMPS, TDMA, or CDMA technology, proper definition of the "neighbor set" or "neighbor list" for each cell or sector is crucial. If the neighbor set is too large, then the cellular system will consume resources unnecessarily. However, if the neighbor set is too small, then the cellular system may miss handoff opportunities, with the result that calls may be dropped. Moreover, in the case of CDMA systems, the pilot channels in each neighbor set should also be prioritized to achieve the most efficient operation.

Several methods for defining the "neighbors" of each cell or sector are known in the art. To a first approximation, the "neighbors" of a given cell or sector may be taken to be the cells or sectors that are closest geographically. Neighbor sets defined in this way will not, in general, be optimal. This is because the geographical approach does not take into account differences in the power transmitted by the different base stations and does not take into account the effects of buildings and topography.

As a result, neighbor sets are usually determined empirically. For example, cellular system operators may travel through the network's wireless coverage areas with receivers to measure, in each cell or sector, the signal strengths of the control or pilot channels of the other cells or sectors. The neighbor set for a given cell or sector is then defined as the set of other cells or sectors whose signal strengths were highest in the given cell or sector. This procedure is very time consuming, however, particularly since it may need to be re-done when changes are made to the wireless network or to the associated topography. The prior art also discloses ways of automating this measurement process by having the cellular system keep track of the measured signal strengths, as reported by the mobile stations during normal operation. However, maintaining this amount of information on a daily basis is undesirable because it consumes a great deal of system resources.

In addition to the above difficulties, the present inventors have discovered that the approach of defining neighbors for handoff purposes based entirely on signal strength is fundamentally flawed because it does not take usage into account. For example, as between two handoff candidate cells that have about equal signal strength, the cell with the lower traffic level is a more desirable handoff candidate from a system perspective. In fact, a cell with a very high traffic level may simply be unavailable for handoff.

Accordingly, it is desirable to provide more efficient methods for generating neighbor lists or for tuning existing neighbor lists.

SUMMARY OF THE INVENTION

In a first principal aspect, the present invention provides a method for tuning a neighbor list used in a wireless telecommunications network. The wireless telecommunications network has a plurality of wireless coverage areas, a record of handoff statistics, and a neighbor list associated with at least a given one of the wireless coverage areas. The wireless telecommunications system makes handoffs from the given wireless coverage area based on signal strength measurements involving wireless coverage areas identified in the neighbor list associated with the given wireless coverage area. The method comprises the following steps. A plurality of m relevant coverage areas are selected from the plurality of wireless coverage areas, exclusive of the given coverage area. For each one of these m relevant coverage areas, a corresponding ranking number is calculated, at least in part, from the handoff statistics. Each ranking number is related to the frequency of handoffs involving the given coverage area and the relevant coverage area. The m relevant coverage areas are ranked based on their corresponding ranking numbers. A first set, consisting of a first number of highest-ranked coverage areas from among the m relevant coverage areas, is identified. The neighbor list is revised to identify each of the relevant coverage areas in the first set.

In a second principal aspect, the present invention provides a method for tuning a neighbor list that includes a first priority set, a second priority set, and a third priority set. A wireless telecommunications network has a plurality of wireless coverage areas, a database of handoff statistics, and a neighbor list associated with at least a given one of the wireless coverage areas. The wireless telecommunications network makes handoffs from the given wireless coverage area based on signal strength measurements involving wireless coverage areas identified in the neighbor list associated with the given wireless coverage area. The method comprises the following steps. A plurality of m relevant coverage areas are selected from the plurality of wireless coverage areas, exclusive of the given coverage area. For each one of these m relevant coverage areas, a corresponding ranking number is calculated, at least in part from the handoff statistics. Each ranking number is related to a frequency of handoffs involving the given coverage area and the corresponding relevant coverage area. The m relevant coverage areas are ranked based on their corresponding ranking numbers. The largest integer, p, that satisfies at least a first predetermined criterion is calculated. Also calculated are the largest integer, q, that satisfies at least a second predetermined criterion and the largest integer, r, that satisfies at least a third predetermined criterion. A first priority set consisting of p highest-ranked coverage areas from among the m relevant coverage areas is identified. A second priority set of q highest-ranked coverage areas from among the m relevant coverage areas not in the first priority set is identified. A third priority set of r highest-ranked coverage areas from among the m relevant coverage areas not in the first or second priority sets. The neighbor list is revised to identify each of the p coverage areas in the first priority set, each of the q coverage areas in the second priority set, and each of the r coverage areas in the third priority set.

The foregoing, as well as other advantages and features of the present invention will become apparent to those of ordinary skill in the art by reading the following detailed description, with appropriate reference to the accompanying drawings.

DETAILED DESCRIPTION OF AN EXEMPLARY EMBODIMENT

Figure 1:
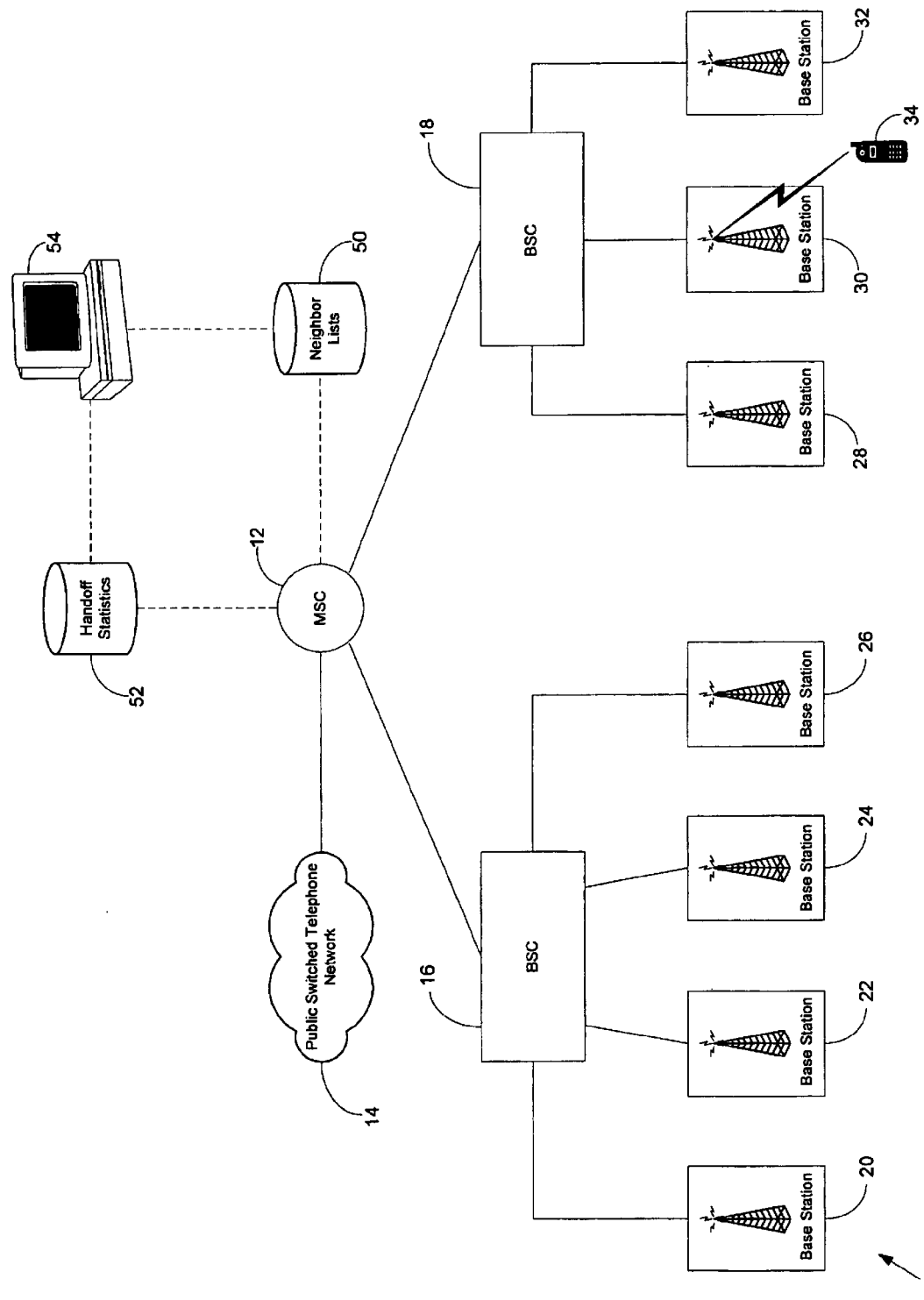
FIG. 1 is a block diagram illustrating an exemplary wireless telecommunications network in which an exemplary embodiment of the present invention can be used.

FIG. 1 shows a functional block diagram of an exemplary wireless telecommunications network 10 in which the present invention can be used. In FIG. 1, logical connections and signaling pathways are represented by dashed lines, and circuit-switched connections for voice, data, and other traffic are represented by solid lines. As shown in FIG. 1, network 10 includes a mobile switching center (MSC) 12 that is connected to public switched telephone network (PSTN) 14 and to base station controllers (BSCs) 16 and 18. BSC 16 is, in turn, connected to base stations 20–26, and BSC 18 is, in turn, connected to base stations 28–32. Although FIG. 1 shows MSC 12 connected to two BSCs, and shows each BSCs 16 connected to three or four base stations, in general, MSC 12 may be connected to a greater or fewer number of BSCs, and each BSC may be connected to a greater or fewer number of base stations. Network 10 may also include more than one MSC, with each MSC typically connected to a plurality of base stations via one or more BSCs. Additionally, MSC 12 may be connected to base stations 20–32 without the use of BSCs 16 and 18.

Each of base stations 20–32 is provided with one or more antennas to define a wireless coverage area, which is typically termed a "cell." In addition, base stations 20–32 may use directional antennas to define, within each cell, a plurality of wireless coverage areas, which are typically termed "sectors." Thus, as used herein, the term "wireless coverage area" or "coverage area" can refer to either cells or sectors. Within its wireless coverage area or areas, each of base stations 20–32 is able to communicate with one or more mobile stations, such as mobile station 34, over an air interface. Mobile station 34 may be a cellular or PCS telephone, a personal digital assistant, or other device that transmits or receives voice, data, or other media over an air interface. The wireless communications over these air interfaces may be in a format such as AMPS, TDMA, CDMA, or some other format. Preferably, wireless network 10 uses CDMA.

Figure 2:
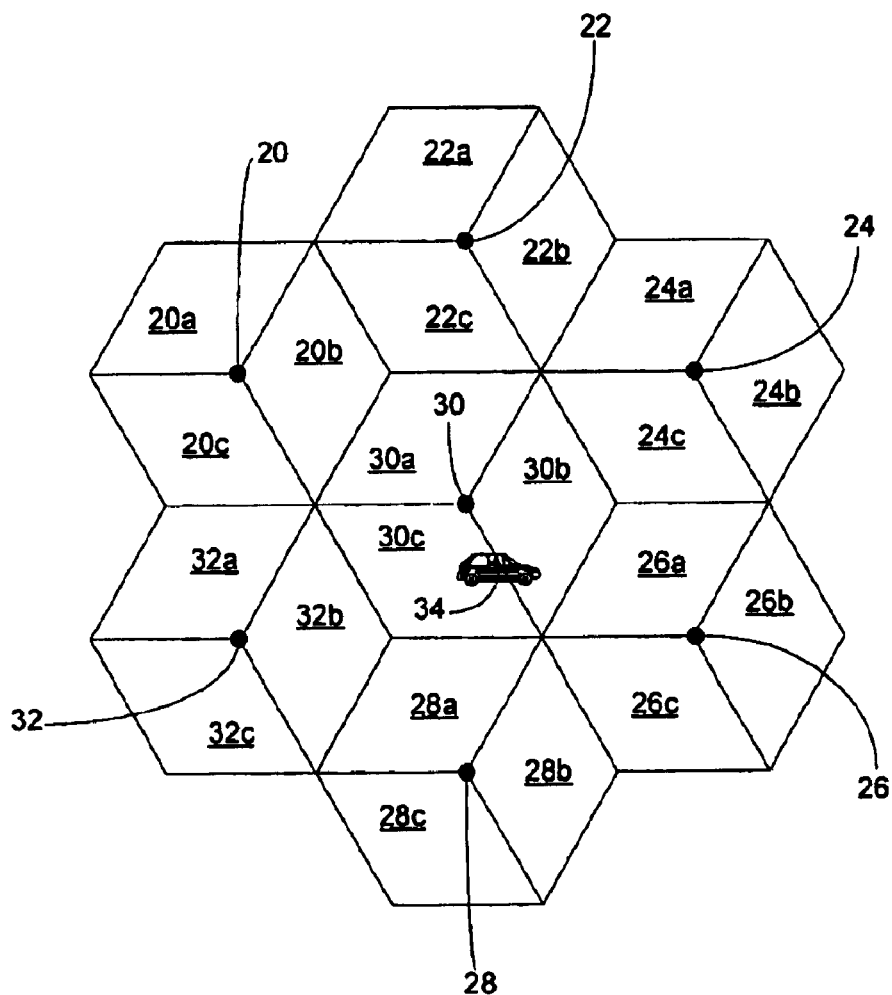
FIG. 2 is a schematic diagram showing the wireless coverage areas provided by the wireless telecommunications network of FIG. 1.

FIG. 2 schematically illustrates the wireless coverage areas provided by base stations 20–32 in accordance with an exemplary embodiment. In this exemplary embodiment, each of base stations 20–32 provides three sectors. Each sector shown in FIG. 2 is identified by the number identifying the base station with either an "a", "b", or "c" appended thereto. In this way, network 10 provides wireless coverage areas 20a through 32c, as shown in FIG. 2. As will be apparent to those of ordinary skill in the art, FIG. 2 illustrates wireless coverage areas 20a through 32c in only a highly idealized fashion. In practice, the geographic extent of wireless coverage areas 20a through 32c may be very different than shown in FIG. 2. For example, while borders are shown between the wireless coverage areas in FIG. 2, typically, the wireless coverage areas will be overlapping, such that, in many locations, a mobile station can communicate with one of any number of base stations. Thus, coverage areas 20a through 32c shown in FIG. 2 are more representative of areas of optimal wireless communication.

Also shown in FIG. 2, for purposes of illustrating a typical handoff event, is mobile station 34 in a vehicle moving from coverage area 30c to coverage area 30b, or, more particularly, moving from the optimal portion of coverage area 30c to the optimal portion of coverage area 30b. Thus, while mobile station in 34 is shown in FIG. 2 moving out of the range of coverage area 30c, mobile station 34 will typically still be able to engage in wireless communication in coverage area 30c and in one or more other coverage areas, such as coverage area 30b.

Base stations 20–32 typically perform radio resource management tasks for their respective wireless coverage areas. MSC 12 is typically responsible for switching calls to the base stations 20–32, and for performing the signaling needed to place calls from and to terminate calls to the mobile stations in wireless communication with base stations 20–32. MSC 12 is also responsible for controlling handoffs between base stations 20–32.

Associated with each of wireless coverage areas 20a through 32c is a neighbor list that identifies other wireless coverage areas that are good candidates for receiving handoffs. More particularly, signal strength measurements involving the wireless coverage areas identified in a given coverage area's neighbor list are made to determine which wireless coverage area should receive handoffs from the given coverage area. In one approach, the signal strength measurements are taken by base stations, such as is typically done in AMPS systems. In another approach, the signal strength measurements are taken by mobile stations, as in the MAHO approach typically used in TDMA and CDMA systems. Alternatively, a combination of these, or other, approaches may be used.

The neighbor lists are typically stored in a database accessible by the MSC. Thus, as shown in FIG. 1, network 10 includes a first database 50 containing neighbor lists for base stations 20–32. Database 50 may be a part of MSC 12. Alternatively, database 50 may be remote from MSC 12 but accessible via a network, such as an SS7 network. Thus, MSC 12 can access the neighbor lists when needed.

In AMPS systems, MSC 12 would typically consult the neighbor list for a given base station when the signal strength from a mobile station in wireless communication for that given base station falls below a threshold level. MSC 12 would then cause the base stations controlling the wireless coverage areas identified in the neighbor list to measure the mobile station's signal strength. In particular, while mobile station 34 is shown moving from coverage area 30c to 30b in the example of FIG. 2, network 10 will not, at first, have sufficient information to determine that mobile station should be handed off to coverage area 30b. To make the appropriate handoff determination, MSC 12 would instruct the base stations corresponding to the coverage areas identified in the neighbor list for coverage area 30c to take signal strength measurements. A typical neighbor list for coverage area 30c may identify coverage areas 30a, 30b, 32b, and 28a, as being the "neighbors" of coverage area 30c. Thus, MSC 12 would instruct base stations 30, 32, and 28 to take signal strength measurements of mobile station 34. From these signal strength measurements, MSC 12 would then determine that mobile station 34 should be handed off to coverage area 30b.

In TDMA and CDMA systems, MSC 12 causes the neighbor lists to be transmitted to the mobile stations, so that the mobile stations will know which control channels or pilot channels to monitor. Thus, in the example shown in FIG. 2, base station 30 would have transmitted to mobile station 34 the neighbor list for coverage area 30c. This neighbor list may, for example, identity coverage areas 30a, 30b, 32b, and 28a, in which case mobile station 34 would periodically monitor the signal strengths of the control or pilot channels corresponding to these identified coverage areas.

In CDMA systems, the coverage areas identified in a neighbor list may be given one of three priority levels, ranging from "2," the highest priority level, to "0," the lowest priority level. Accordingly, mobile stations measure the signal strengths of pilot channels given a "2" priority most often and measure the signal strengths of pilot channels given a "0" priority least often. In the example illustrated in FIG. 2, the neighbor list for coverage area 30c may designate areas 30a, 30b, 32b, and 28a as being priority level "2," areas 20b, 20c, 32a, 26a, 26c, and 28b, as being priority level "1," and areas 22c, 24c, 32c, and 28c as being priority level "0."

With reference to FIG. 1, network 10 also has access to a record of handoff statistics. These handoff statistics reflect, inter alia, the successful handoffs actually made by MSC 12, and, optionally, by other MSCs in network 10, during a particular period of time. Preferably the handoff statistics include a record for each handoff made, with each record identifying the original coverage area, the destination coverage area, and the date and time the handoff occurred. Alternatively, the handoff statistics may be in a more condensed form. The record of handoff statistics, is preferably stored in a second database 52 connected to MSC 12 via a network, such as an SS7 network. Alternatively, the record of handoff statistics may be stored in one or more other databases, such as database 50. The record of handoff statistics may also be stored in a non-volatile form.

Preferably, MSC 12 updates the record of handoff statistics automatically each time it initiates or completes a handoff. Alternatively, the record of handoff statistics may be collected by other means.

The present invention provides a method for tuning existing neighbor lists, based on the record of handoff statistics. Preferably, the method is implemented by programming a computer 54 that is connected to databases 50 and 52. As described in more detail below, when so programmed, computer 54 uses the record of handoff statistics, preferably contained in database 52, to tune the neighbor lists stored in database 50. Typically, tuning the neighbor lists will involve revising one or more existing neighbor lists. In revising a neighbor list, one or more new coverage areas may be identified, one or more existing coverage area identifications may be deleted, or the priority level assigned to one or more coverage areas may be changed.

This tuning of neighbor lists may be conducted periodically in order to account for changes in traffic patterns or for changes made to the network 10. Moreover, periodic tuning of neighbor lists can be used to spot problems in the network, such as coverage areas that do not have many neighbors, and changes to the network may be made in response to such problems. For example, the locations or broadcast powers of antennas could be modified.

In accordance with present invention, the method for tuning the neighbor list for a given wireless coverage typically includes the steps of: (1) selecting a plurality of relevant coverage areas; (2) calculating, for each one of the relevant coverage areas, a ranking number related to the frequency of handoffs involving the given coverage area and that relevant coverage area; (3) ranking the relevant coverage areas based on their corresponding ranking numbers; (4) identifying a number of highest-ranked relevant coverage areas; and (5) revising the neighbor list for the given area to identify these highest-ranked coverage areas. These steps are described in more detail below.

In the first step, from among the many wireless coverage areas provided by wireless telecommunications network 10, exclusive of the given coverage area, a plurality of m wireless coverage areas are selected as being relevant for constructing the neighbor list for the given coverage area. These relevant coverage areas may be designated $C_1 \ldots C_m$. In the simplest case, this set of relevant coverage areas may be all of the wireless coverage areas in network 10, exclusive of the given coverage area. Alternatively, a subset of all of the wireless coverage areas may be used, such as the wireless coverage areas in the given coverage area's geographic area. For example, the wireless coverage areas in the metropolitan area in which the given coverage area is located may be selected as the relevant coverage areas.

In the second step, for each of the m relevant coverage areas, $C_i$, where i can range from 1 to m, a corresponding ranking number, $N_i$, is calculated, thereby providing m ranking numbers. Each ranking number, $N_i$, is related to the frequency of handoffs involving relevant coverage area, $C_i$, and the given coverage area. Moreover, the calculation of the ranking numbers is based, at least in part, on the handoff statistics. The details of the calculation of the ranking numbers will depend on the information contained in the handoff statistics. In simple cases, the handoff statistics will already have a tally of handoffs for each pair of coverage areas. Then, each ranking number, $N_i$, may be taken as the number of handoffs involving coverage area $C_i$ and the given coverage area, counting both handoffs from $C_i$ to the given coverage area and from the given coverage area to $C_i$, as reflected in the handoff statistics. In other cases, the handoff statistics may not already include such a tally. For example, the handoff statistics may simply list each handoff made in a given period of time. In such cases, the calculation of the ranking numbers may require tallying the number of handoffs involving each relevant coverage area and the given coverage area before proceeding with the calculation described above. In still other cases, the handoff statistics may not include an actual number of handoffs made, but some other number reflecting a handoff frequency. For example, the handoff statistics may simply record the average number of handoffs per day made between each pair of coverage areas, in which case, these average numbers may be used in place of actual tallies to calculate ranking numbers. However the information is recorded, the calculated ranking numbers is preferably related to handoff frequency.

In addition to extracting the relevant information from the handoff statistics, the calculation of the ranking numbers may involve additional processing, such as scaling or weighting. Such additional processing may, for example, involve other information than that reflected in the handoff statistics. For example, if a certain relevant coverage area's capacity has been reduced, or its usage is anomalously high, then its corresponding ranking number may be weighted downward. Similarly, if a certain relevant coverage area's capacity has been increased, or it has been underused, then its corresponding ranking number may be weighted upward.

In the third step, the m relevant coverage areas are ranked based on their corresponding ranking numbers. Thus, the highest-ranked relevant coverage area will have the highest ranking number, which will typically mean that it has the highest handoff frequency with the given coverage area.

In the fourth step, a first set of relevant coverage areas is chosen from this ranked list of relevant coverage areas, wherein the first set consists of a first number of the highest-ranked coverage areas. This first number may be determined in a variety of different ways. It may simply be a predetermined number. It may be the number of highest-ranked coverage areas that account for a predetermined percentage of the total number of handoffs. A particularly preferred method for determining how many highest-ranked coverage areas to include in the neighbor list is described below.

In the fifth step, the existing neighbor list for the given coverage area is revised so that it identifies the relevant coverage areas in the first set. Typically, the neighbor list will identify each coverage area by its pilot channel or control channel. If the existing neighbor list also identified other cover areas not in the first set, these other identifications may be deleted.

As noted above, in a preferred approach used for CDMA, the coverage areas identified in the neighbor list are assigned one of three priority levels. Thus, in general, the coverage areas identified in the neighbor list may comprise: (1) a first priority set, in which the coverage areas have a "2," or highest, priority level; (2) a second priority set, in which the coverage areas have a "1" priority level; and (3) a third priority set, in which the coverage areas have a "0," or lowest, priority level. Accordingly, the method would identify: (1) a first priority set consisting of the highest-ranked coverage areas; (2) a second priority set consisting of the q highest-ranked coverage areas not in the first priority set; and (3) a third priority set of the r highest-ranked coverage areas not in the first or second priority sets. The method would then revise the neighbor list to identify each of the p coverage areas in the first priority set, each of the q coverage areas in the second priority set, and each of the r coverage areas in the third priority set.

The integers p, q, and r may be determined in a variety of different ways. Typically, p is the largest integer that satisfies at least a first predetermined criterion, q is the largest integer that satisfies at least a second predetermined criterion, and r is the largest integer that satisfies at least a third predetermined criterion. Typical predetermined criteria for finding p, q, and r may include a requirement that the number of coverage areas in a given priority set, or a combination of priority sets, can be no greater than a predetermined number and/or a requirement that the sum of the ranking numbers for the coverage areas in a given priority set, or a combination of priority sets, can be no greater than a predetermined percentage of the sum of the ranking numbers for all m relevant coverage areas. Thus, to apply certain predetermined criteria, all of the m ranking numbers may be summed to provide a total sum, $N_{total}$.

Accordingly, in a preferred method for finding the largest integer p that satisfies first predetermined criteria, the ranking numbers for the relevant coverage areas in the first priority set are summed to provide a first sum, and the first predetermined criteria require the first sum to be no greater than a first predetermined percentage of $N_{total}$ and require p to be no greater than a first predetermined number. Once p is found, in a preferred method for finding the largest integer q that satisfies second predetermined criteria, the ranking numbers for the relevant coverage areas in the first and second priority sets are summed to provide a second sum, and the second predetermined criteria require the second sum to be no greater than a second predetermined percentage of $N_{total}$ and require p+q to be no greater than a second predetermined number. Once p and q are found, in a preferred method for finding the largest integer r that satisfies third predetermined criteria, the ranking numbers for the relevant coverage areas in the first, second, and third priority sets are summed to provide a third sum, and the third predetermined criteria require the third sum to be no greater than a third predetermined percentage of $N_{total}$ and require p+q+r to be no greater than a third predetermined number.

For example, in a particularly preferred method used for CDMA, the ranked coverage areas are added in succession to the first priority set, starting with the highest-ranked coverage area, until adding the next coverage area in the ranked list would violate either one of the following two rules: (1) the first priority set can account for no more than 70% of the handoff pairs involving the given coverage area, or, more generally, the sum of the ranking numbers for all of the coverage areas in the first priority set must be less than or equal to $0.7N_{total}$ and (2) the first priority set can include no more than six coverage areas. The method then adds the next highest ranking coverage areas to the second priority set, until adding the next highest ranking coverage areas would violate either one of the following two rules: (1) the first and second priority sets together can account for no more than 93% of the handoff pairs involving the given coverage area, or, more generally, the sum of the ranking numbers for all of the coverage areas in the first and second priority set must be less than or equal to $0.93N_{total}$; and (2) the first and second priority sets together can include no more than twelve coverage areas. Finally, the method then adds the next highest ranking coverage areas to the third priority set until adding the next highest ranking coverage area would violate either one of the following two rules: (1) the first, second, an third priority sets together can account for no more than 96% of the handoff pairs involving the given coverage area, or, more generally, the sum of the ranking numbers for all of the coverage areas in the first, second, and third priority sets must be less than or equal to $0.96N_{total}$; and (2) the first, second, and third priority sets together can include no more than twenty coverage areas. However, if the first, second, and third priority sets together contain less than ten coverage areas, the method preferably adds the next highest ranking coverage areas to the third priority set until either: (1) the three priority sets together have at least ten coverage areas; or (2) the three priority sets account for all of the handoff pairs, or, more generally, until the sum of the ranking numbers for the coverage areas in all of the three priority sets is equal to $N_{total}$.

Although in the particularly preferred method described above, the first, second, and third predetermined numbers are 6, 12, and 20, respectively, and the first, second, and third predetermined percentages are 70%, 93%, and 96%, respectively, other predetermined numbers and percentages could also be used. Further, although three priority levels are used in the most preferred method, the method can employ a greater or fewer number of priority levels. For example, AMPS and TDMA neighbor lists typically use only one priority level.

Thus, the present invention beneficially overcomes many of the deficiencies in prior art approaches by defining an efficient set of neighboring cells or sectors based on the handoffs actually made to or from those cells or sectors during normal operation. In this way, the neighbor lists will take into account traffic patterns, i.e., the availability of cells or sectors to accept handoffs, as well as signal strengths. Moreover, keeping track of handoffs will normally consume less of a network's resources than keeping track of measured signal strengths.

An exemplary embodiment of the present invention has been illustrated and described. It will be understood, however, that changes and modifications may be made to the invention without deviating from the spirit and scope of the invention, as defined by the following claims.

What is claimed is:

1. In a wireless telecommunications network having a plurality of wireless coverage areas, a record of handoff statistics, and a neighbor list associated with at least a given one of said plurality of wireless coverage areas, wherein said wireless telecommunications system makes handoffs from said given wireless coverage area based on signal strength measurements involving wireless coverage areas identified in said neighbor list, a method for tuning said neighbor list for said given wireless coverage area, said method comprising the steps of:

selecting m relevant coverage areas from said plurality of wireless coverage areas, exclusive of said given coverage area;

for each one of said m relevant coverage areas, calculating, based at least in part on said handoff statistics, a corresponding ranking number related to a frequency of handoffs involving said given coverage area and said one of said m relevant coverage areas, thereby providing m ranking numbers;

ranking said m relevant coverage areas based on their corresponding ranking numbers;

identifying a first set consisting of a first number of highest-ranked coverage areas from among said m relevant coverage areas; and revising said neighbor list to identify each of said first number of coverage areas in said first set.

2. The method of claim 1, wherein said first set defines a first priority set in said neighbor list.

3. The method of claim 2, further comprising the steps of:

identifying a second set consisting of a second number of highest-ranking coverage areas from among said m relevant coverage areas not in said first set; and revising said neighbor list to identify each of said second number of coverage areas in said second set.

4. The method of claim 3, said second set defines a second priority set in said neighbor list.

5. The method of claim 4, further comprising the steps of:

identifying a third set consisting of a third number of highest-ranked relevant coverage areas from among said m relevant coverage areas not in said first or second sets; and revising said neighbor list to identify each of said third number of coverage areas in said third set.

6. The method of 5, wherein said third set defines a third priority set in said neighbor list.

7. The method of claim 1, further comprising the steps of:

summing said m ranking numbers to provide a total sum; and summing the ranking numbers of relevant coverage areas in said first set to provide a first sum.

8. The method of claim 7, wherein said first sum is no greater than a first predetermined percentage of said total sum.

9. The method of claim 7, further comprising the steps of:

summing said m ranking numbers to provide a total sum; and summing the ranking numbers of relevant coverage areas in said first and second sets to provide a second sum.

10. The method of claim 9, wherein said second sum is no greater than a second predetermined percentage of said total sum.

11. The method of claim 9, further comprising the steps of:

summing said m ranking numbers to provide a total sum; and summing the ranking numbers of relevant coverage areas in said first, second, and third sets to provide a third sum.

12. The method of claim 11, wherein said third sum is no greater than a third predetermined percentage of said total.

13. In a wireless telecommunications network having a plurality of wireless coverage areas, a database of handoff statistics, and a neighbor list associated with at least a given one of said plurality of wireless coverage areas, wherein said wireless telecommunications system makes handoffs from said given wireless coverage area based on signal strength measurements involving wireless coverage areas identified in said neighbor list, said neighbor list including a first priority set, a second priority set, and a third priority set, a method for tuning said neighbor list, said method comprising the steps of:

selecting m relevant coverage areas from said plurality of wireless coverage areas, exclusive of said given coverage area;

for each of one of said m relevant coverage areas calculating, based at least in part on said handoff statistics, a corresponding ranking number related to a frequency of handoffs involving said given coverage area and said one of said m relevant coverage areas, thereby providing m ranking numbers;

ranking said m relevant coverage areas based on their corresponding ranking numbers;

finding a largest integer, p, that satisfies at least a first predetermined criterion;

finding a largest integer, q, that satisfies at least a second predetermined criterion; finding a largest integer, r, that satisfies at least a third predetermined criterion;

identifying a first priority set consisting of p highest-ranked coverage areas from among said m relevant coverage areas;

identifying a second priority set consisting of q highest-ranked coverage areas from among said m relevant coverage areas not in said first priority set;

identifying a third priority set consisting of r highest-ranked coverage areas from among said m relevant coverage areas not in said first or second priority sets; and revising said neighbor list to identify each of said p coverage areas in said first priority set, each of said q coverage areas in said second priority set, and each of r coverage areas in said third priority set.

14. The method of claim 13, further comprising the steps of:

summing said m ranking numbers to provide a total sum;

summing the ranking numbers of relevant coverage areas in said first priority set to provide a first sum, wherein said at least a first predetermined criterion requires said first sum to be no greater than a first predetermined percentage of said total sum and requires p to be no greater than a first predetermined number.

15. The method of claim 14, further comprising the steps of:

summing said m ranking numbers to provide a total sum;

summing the ranking numbers of relevant coverage areas in said first and second priority sets to provide a second sum, wherein said at least a second predetermined criterion requires said second sum to be no greater than a second predetermined percentage of said total sum and requires p+q to be no greater than a second predetermined number.

16. The method of claim 15, further comprising the steps of:
    summing said m ranking numbers to provide a total sum;
    summing the ranking numbers of relevant coverage areas in said first, second, and third priority sets to provide a third sum,
    wherein said at least a third predetermined criterion requires said third sum to be no greater than a third predetermined percentage of said total and requires p+q+r to be no greater than a third predetermined number.

17. The method of claim 13, further comprising the step of:
    if r is less than a fourth predetermined number, identifying in said third priority set at least one of said m relevant coverage areas not previously identified in said neighbor list.

* * * * *